(12) United States Patent
Bell et al.

(10) Patent No.: US 7,729,810 B2
(45) Date of Patent: Jun. 1, 2010

(54) ELECTRICAL POWER DISTRIBUTION CONTROL SYSTEMS AND PROCESSES

(75) Inventors: David G. Bell, Nine Mile Falls, WA (US); Thomas L. Wilson, Ladera Ranch, CA (US); Kenneth M. Hemmelman, Spokane, WA (US)

(73) Assignee: Programable Control Services, Inc., Spokane, WA (US)

(\*) Notice: Subject to any disclaimer, the term of this patent is extended or adjusted under 35 U.S.C. 154(b) by 0 days.

(21) Appl. No.: 11/397,091

(22) Filed: Apr. 4, 2006

(65) Prior Publication Data

US 2006/0195229 A1 Aug. 31, 2006

Related U.S. Application Data

(63) Continuation-in-part of application No. 10/117,723, filed on Apr. 1, 2002, now Pat. No. 7,069,117, and a continuation-in-part of application No. 10/729,418, filed on Dec. 5, 2003, now abandoned.

(51) Int. Cl.
 G05D 23/00 (2006.01)
 G06F 15/18 (2006.01)

(52) U.S. Cl. .................. 700/295; 700/286; 700/48; 706/15; 706/21

(58) Field of Classification Search .................. 700/48, 700/295, 286; 323/209; 706/15, 21, 22, 706/45; 701/34
See application file for complete search history.

(56) References Cited

U.S. PATENT DOCUMENTS

| | | | |
|---|---|---|---|
| 6,484,133 B1 * | 11/2002 | Vogt | 702/190 |
| 6,741,919 B1 * | 5/2004 | Schuster et al. | 701/34 |
| 2004/0253489 A1 * | 12/2004 | Horgan et al. | 429/13 |
| 2006/0229768 A1 * | 10/2006 | Chassin et al. | 700/295 |

\* cited by examiner

*Primary Examiner*—Paul L Rodriguez
*Assistant Examiner*—Sheela Rao
(74) *Attorney, Agent, or Firm*—Steven C. Stewart

(57) ABSTRACT

In one aspect, the present disclosure describes a power adjustment process. The process for power distribution regulation includes filtering data from electrical sensors to provide conditioned data representative of a portion of a power distribution grid and determining, by a controller and based in part on the conditioned data, when an increase or decrease in an output parameter from one regulator of a plurality of regulators in the power distribution grid will reduce system power consumption. The process also includes increasing or decreasing the associated output electrical parameter in response to the controller determining that such will reduce system power consumption.

15 Claims, 8 Drawing Sheets

ELECTRICAL POWER DISTRIBUTION CONTROL SYSTEMS AND PROCESSES

RELATED APPLICATIONS AND PRIORITY DATA

This application is a Continuation-in-Part of, and claims priority to, both of: (1) U.S. patent application Ser. No. 10/117,723, filed on Apr. 1, 2002 now U.S. Pat. No. 7,069,117, published as U.S. Patent Application Publication No. 2003/0187550 A1 on Oct. 2, 2003, entitled "Electrical power distribution control systems and processes", naming T. Wilson and K. Hemmelman as inventors and which is assigned to the assignee of this application, the disclosure of which is hereby incorporated herein by reference; and (2) U.S. patent application Ser. No. 10/729,418, filed on Dec. 5, 2003, published as Published U.S. Patent Application Publication No. 2005/0125104 A1 on Jun. 9, 2005, now abandoned entitled "Electrical power distribution control systems and processes", naming T. Wilson, D. Bell and K. Hemmelman as inventors and which is assigned to the assignee of this application, the disclosure of which is hereby incorporated herein by reference.

TECHNICAL FIELD

The disclosure relates to electrical power distribution systems, processes and apparatus and power management in power distribution systems. More particularly, the present disclosure relates to power conservation and selective power regulation in power distribution systems.

BACKGROUND

In electrical power distribution systems, several needs compete and must be simultaneously considered in managing electrical power distribution. A first concern has to do with maintaining delivered electrical power voltage levels within predetermined limits. A second concern relates to overall efficiency of electrical power generation and distribution. A third concern relates to these and other concerns in light of changing electrical loading of the system and variations in the character of the loading. A fourth concern relates to power system management under conditions associated with an increased probability of compromise of large scale ability to deliver appropriate power.

It is generally desirable to manage a power grid to reduce overall power consumption while maintaining adequate delivered voltage minimum and maximum levels across the system. In other words, the voltage levels actually delivered to various users need to be kept within predetermined limits while delivering power efficiently, without undue power loss in the delivery system or power grid, including the power generation equipment. As power usage within the system changes, in accordance with diurnal, weekly and seasonal factors, among others, need for regulation of power distribution changes as well. To an extent, some of these changes are reasonably predictable, however, other aspects of these changes may not be readily predictable.

Predictable changes in system loading are forecast by integrating power demand over time and considering this draw together with other factors, such as increased outdoor temperature and known diurnal variation patterns. For example, when summer heat results in increased power demand for air conditioning during the course of the day, fast food power demand associated with the end of the work day may indicate that a power shortage is imminent. Typically, measurements of power demand and delivered voltage are made every few seconds, filtered to reveal variations with periodicities on the order of a few minutes or longer, and adjustments to voltage are made perhaps once or twice an hour. This is called "automated conservation voltage reduction" and is intended to reduce overall energy demand.

However, compromise of power delivery capability due, for example, to extreme weather conditions (e.g., gale winds affecting the distribution system) or unforeseen decrease in available power (e.g., generator malfunction) is not necessarily amenable to precise forecasting but is observable. As a result, there is need for dynamic system adjustment in response to observed changes in system capacity, conditions and loading.

Increased probability of compromise of large scale ability to deliver appropriate power may include increased probability of system-wide failure or blackout of an area, where "system-wide failure" could mean either a large grid being shut down or a smaller grid being isolated from a larger grid, with a potential result that the smaller grid then would be shut down or malfunction. In some cases, grid failure may be caused by automated shutdown of one or more generators in response to determination of grid conditions ill-suited to the generator in order to obviate catastrophic generator failure.

The conditions associated with an increased probability of compromise of large scale ability to deliver appropriate power are varied, and can range from "brownout" situations to complete disruption of electrical service or "blackouts". Some types of power consumption relate to relatively vital concerns, such as hospitals, infrastructural support systems (telephone, police, fire protection, electrical traffic signals and the like) and others relate to more quotidian concerns, such as air conditioning, fast food operations and industrial operations such as aluminum smelters and the like, as equipment is added to or removed from service, for example.

The latter types of concerns can present a high electrical draw at certain times of day. However, interruption of power delivery to such operations does not usually present life-threatening consequences when such operations are without electrical power.

Further, in the event of severe disruption or demand, grid systems used for delivery of electrical power can experience catastrophic failure when load conditions presented to generators in the system are such that one or more electrical generators are automatically shut down or disconnected from the system. This situation obviously places increased demand or even less suitable loading conditions on other generators or grids to which the grid is coupled. As a result, other generators or grids coupled to the affected grid may disconnect from the affected grid, potentially resulting in a blackout. Such blackouts can be extremely widespread in electrical generation and distribution systems employed multiple coupled grids each having electrical generation capability.

Prior art power regulation systems include fusing, opening switches at a power station or substation to remove load components, or sending out trucks with technicians to manually open switches to remove portions of the load from the system, or to manually adjust power regulators and set points. These methods are not amenable to rapid, dynamic load adjustment or rapid, dynamic power management.

Another prior art system provides equipment at the user site that disables high load appliances, such as hot water heaters, on demand. This may be based on forecasting of anticipated excess demand. Such systems are known as "demand side control" systems. These tend to be expensive, in part because the number of control switches is high.

Needed are systems, apparatus and processes for (i) optimizing efficiency of power delivery while maintaining delivered voltage levels within acceptable limits under changing conditions for electrical power demand and (ii) coping with conditions associated with an increased probability of compromise of large scale ability to deliver appropriate power in such a way as to avoid compromise of critical concerns and to further avoid catastrophic electrical system failure.

SUMMARY

In one aspect, the present disclosure describes a process for power distribution regulation. The process for power distribution regulation includes filtering data from electrical sensors to provide conditioned data representative of a portion of a power distribution grid and determining, by a controller and based in part on the conditioned data, when an increase or decrease in an output parameter from one regulator of a plurality of regulators in the power distribution grid will reduce system power consumption. The process also includes increasing or decreasing the associated output electrical parameter in response to the controller determining that such will reduce system power consumption.

DETAILED DESCRIPTION

Introduction

Methods and apparatus for implementing stabilized closed-loop control of delivered voltage in electric power distribution systems are disclosed. The disclosed concepts facilitate regulation of the delivered distribution voltage within predefined bounds, consistent with the adjustment capabilities of regulators such as regulating transformers.

Environment

Figure 1:
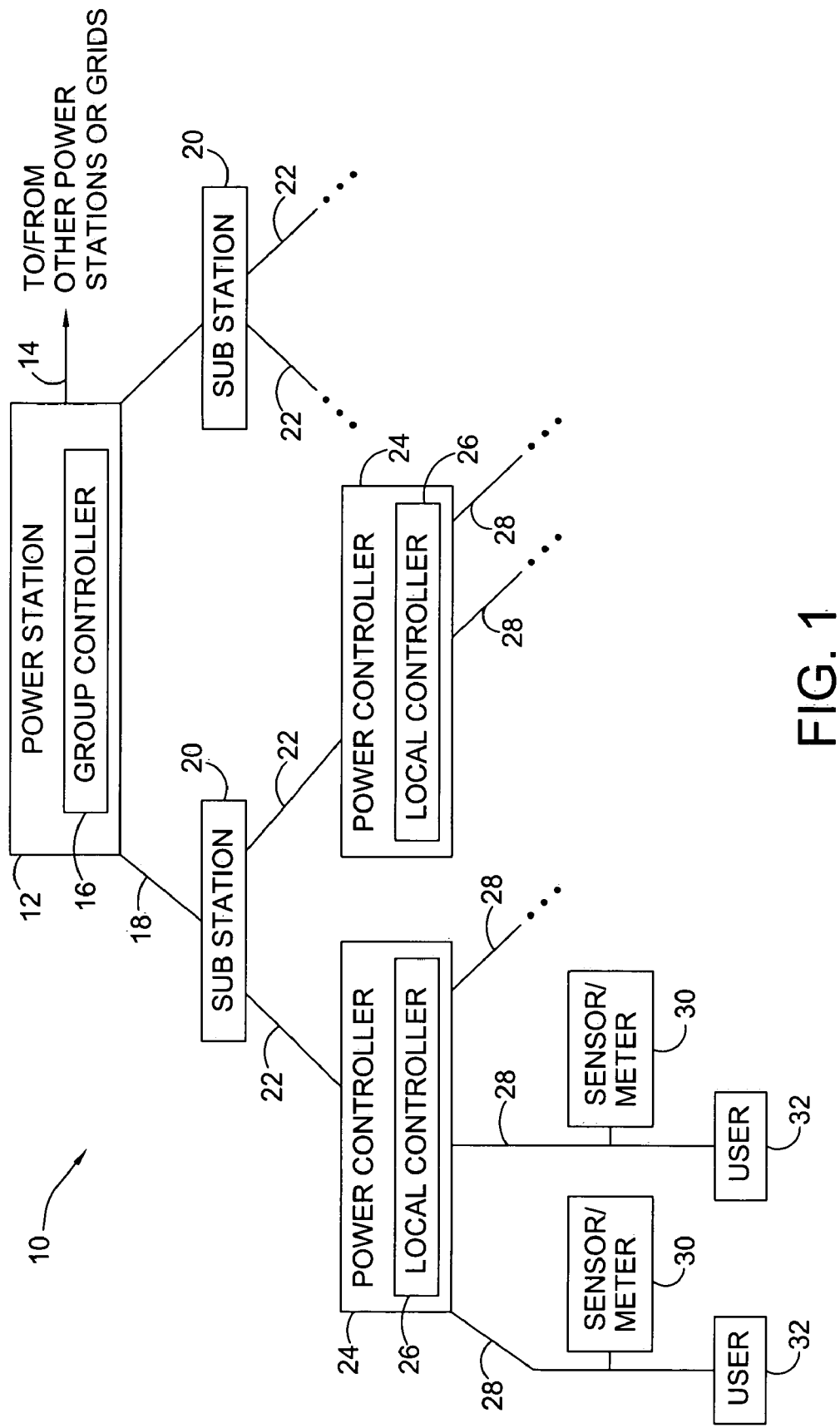
FIG. 1 is a block diagram of an electrical power distribution system, which is an exemplary environment suitable for implementation of the presently-disclosed concepts.

FIG. 1 is a block diagram of an electrical power distribution system 10, which is an exemplary environment suitable for implementation of the presently-disclosed concepts. The power distribution system 10 includes a power station 12, which may be coupled to a power source or sink via a high voltage bus 14. In one embodiment, the power station 12 includes one or more generators. In one embodiment, the power station 12 distributes power delivered via the bus 14. In one embodiment, the power station 12 delivers power to other power distribution systems via the bus 14. As will be appreciated, the role of the power station 12 may change with time and demand, i.e., it may supply excess power to other systems when local load conditions permit and it may be supplied with power at other times when local load conditions require such.

The power station 12 includes one or more group controllers 16. Power is distributed via buses 18 from the power station 12 to one or more substations 20. In turn, each substation 20 delivers power further "downstream" via buses 22. It will be appreciated that a series of voltage transformations are typically involved in transmission and distribution of electrical power via the various power stations 12 and substations 20 and that the system 10 being described exemplifies such systems that may include additional or fewer layers of transformation and distribution.

The substation 20 delivers electrical power via buses 22 to one or more power regulation devices 24, which may include a local controller 26. In turn, the power regulation devices 24 deliver electrical power further downstream via buses 28. Ultimately, electrical power is coupled to a sensor 30 and/or to a user 32. Sensors 30 tend to be associated with critical loads such as hospitals.

In one embodiment, the electrical power is coupled to a sensor 30 capable of determining electrical parameters associated with power consumption and transmitting those assessed parameters to the associated local controller 26 and/or to the group controller 16. It will be appreciated that any medium suitable to data transmission may be employed, such as radio links, which may utilize spread spectrum coding techniques or any suitable carrier modulation of spectrum management methods suitable for data communications, point-to-point radio links, fiber optical links, leased lines, data signals coupled via power lines or buses, telephone links or other infrastructural data communications paths. In some embodiments, such may also be conveniently collateral to power distribution system elements (e.g., coaxial cables employed for data transmission such as are often employed in cable television systems).

In one embodiment, the sensor 30 measures voltage and is also part of an electrical meter used for measuring the amount of electrical power used and thus for determining billing data, such as a conventional Automatic Meter Reader or AMR. In one embodiment, the sensor 30 is equipped to assess line voltage delivered to the user 32, or "delivered voltage". In one embodiment, the sensor 30 is equipped to measure current.

In one embodiment, the local controller is configured to respond to several associated sensors. This may be accomplished by dynamically determining which one or ones of an associated plurality of sensors is providing data most relevant to determining how to most effectively adjust the associated output electrical parameter. Effective control of power delivered by the associated power regulation device 24 is determined by selecting between the associated sensors, dependent upon changes in current draw in different loads controlled by the power regulation device 24, load shifts or voltage changes. In one embodiment, the selection tends to be responsive to the sensor that results in optimal power conservation.

In one embodiment, the sensor 30 is equipped to assess power factor, also known as VAR or Volt Amperes Reactive, that is, the phase shift induced by inductive or capacitive loads. Power factor can be significant because transmission losses known as $I^2R$ losses can increase when the currents associated with driving the load increase without necessarily delivering more total work to the load.

These losses can result in situations where the total power demanded from the power station 12 or substation 20 actually decreases when line voltage to the user 32 increases. One example of such a situation is where the load is highly inductive and the amount of work accomplished is controlled primarily by the amount of current drawn by the load, e.g., loads including electrical motors.

Conventional power distribution systems provide some correction of or management of power factor or VAR by switching reactive elements, such as shunt capacitors, into or out of the system at strategic locations. These conventional systems do not attempt to reduce losses by voltage adjustment.

Conventional Supervisory Control And Data Acquisition (SCADA) systems have not in the past been associated with incremental voltage controllers. In particular, such systems have not been affiliated with controllers that are equipped to test for conditions where a decrease in delivered voltage can reduce overall power consumption by providing improved power factor.

In the presently-disclosed system, such a controller advantageously also effectuates data collection and logging. In one embodiment, at least the group controller 16 records a conventional system data log for tracking voltage, current, kiloWatt hours and power factor or kilo volt-amp reactive power and the like over time. In one embodiment, at least the group controller 16 records a conventional event log for tracking load tap control data, voltage regulation data and breaker operations and the like over time. In one embodiment, at least the group controller 16 records a conventional status log for tracking position of load tap controls, voltage regulator setting, breaker settings and the like over time.

In one embodiment, the group controller 16 records minimum and maximum values for conventional electrical parameters such as voltage, kiloWatt flow, KVAR and the like versus time. In one embodiment, such conventional data are collected at regular intervals, such as every thirty seconds or every minute. Other suitable intervals can also be used. In any case, suitable criteria for determining such a sampling interval is typically two-fold: a) the magnitude- and frequency-of-variation of the observed process (i.e., system parameter)—for example, the variation in distribution system loading, both real and reactive, and the resulting effect on remote line voltage; and b) the intended use of the observed process, which can include identification of, for example, statistical measures or spectra of selected distribution system parameters (voltage, current, VARS, etc.). In one embodiment, additional such conventional data logs are recorded by local controllers 26 as well. In this context of control system, "parameter" means a constant, a coefficient, or other numerical configuration entity that alters the behavior of a control system in predictable ways. As discussed immediately above, parameter refers to observed signals, measurements or the like.

Figure 2:
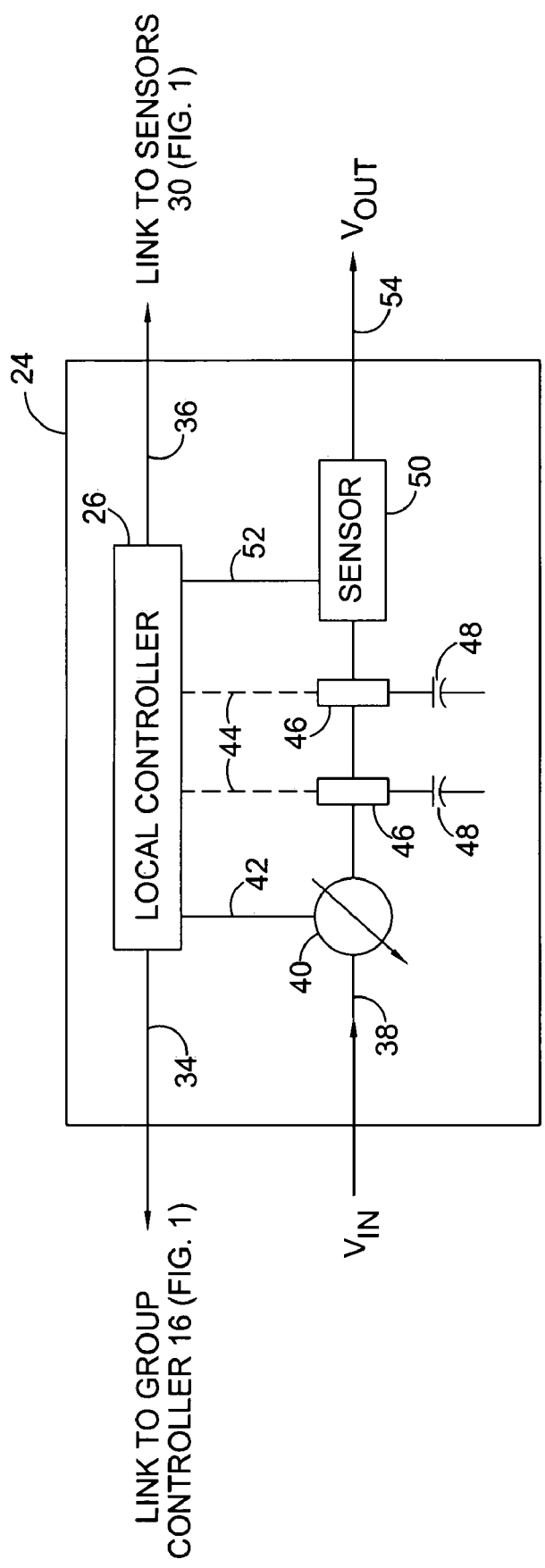
FIG. 2 is a block diagram of a power controller useful in the system of FIG. 1.

FIG. 2 is a block diagram of a power controller 24 for use in the system 10 of FIG. 1. The power controller 24 includes the local controller 26 of FIG. 1. The local controller 26 is linked to the group controller 16 via a data path 34 and is linked to the downstream sensors 30 of FIG. 1 via a data path 36. The power controller 24 accepts input electrical energy $V_{IN}$ via a bus 38 that is coupled to a voltage regulator 40. In one embodiment, the voltage regulator 40 comprises a conventional autotransformer employing a make-before-break variable tap that is set in conformance with command signals communicated from the local controller 16 via a data path 42.

The power controller 24 also optionally includes a data path 44 coupled to switches 46. The switches 46 couple elements 48 for power factor management into or out of the circuit in response to commands from the local controller 26. In one embodiment, the elements 48 comprise conventional capacitors that are switched into or out of the circuit in conformance with commands from the local controller 26.

A sensor 50 is coupled to the local controller 26 via a data path 52. The sensor 50 measures electrical parameters associated with electrical energy leaving the power controller 24, such as kiloWatt hours, current, voltage and/or power factor. The power controller 24 delivers electrical energy $V_{OUT}$ for downstream distribution via a bus 54.

In one embodiment, the local controller 26 regulates power delivery subject to overriding commands from the group controller 16. In one embodiment, the power controller 24 increments (or decrements) line voltage at the 120/240 volt distribution level. In one embodiment, the power controller 24 changes output voltage in increments of ⅝%, or about 0.75 volt steps at the 120 volt basis. In one embodiment, when larger changes in voltage are desirable, the power controller 24 allows a stabilization interval of between forty seconds and two minutes between an increment and evaluation of system parameters prior to making a next incremental voltage change.

In one embodiment, the power controller 24 maintains delivered line voltage in band of voltages ranging from about 110 volts or 114 volts to about 126 volts to 129 volts, with 117 volts being exemplary, and with a reduced level of about 110 to 100 volts being applicable in emergency or brownout situations. Relevant standards in this regard include those of the American National Standards Institute (ANSI), C84.1-1995, and the Canadian Standards Association (CSA), CAN-3-C235-83, reaffirmed in 2000.

In one embodiment, multiple power controllers 24 are situated downstream of a master controller 24. For example, in aluminum smelting plants, such an arrangement may be advantageous in order to provide a recommended voltage or current to the smelting cells, and to optimize energy costs.

In silicon refining plants, power control can be crucial to maintaining the melt at the appropriate temperature and also for maintaining an appropriate rotation speed in Czochralski crystal growth apparatus. As a result, the criticality of power regulation depends on the end use to which the user puts the power. Programming parameters used in the local controller 26 of the power controllers 24 can be set in light of these needs to effect the desired power regulation.

In some power distribution situations, power control is important because the contractual arrangements between the user and the service provider result in increased power rates for a period, such as a year, if a maximum or peak amount of power contracted for is exceeded even once. Accordingly, such users have incentives to regulate power use to obviate exceeding that contractual amount.

Figure 3:
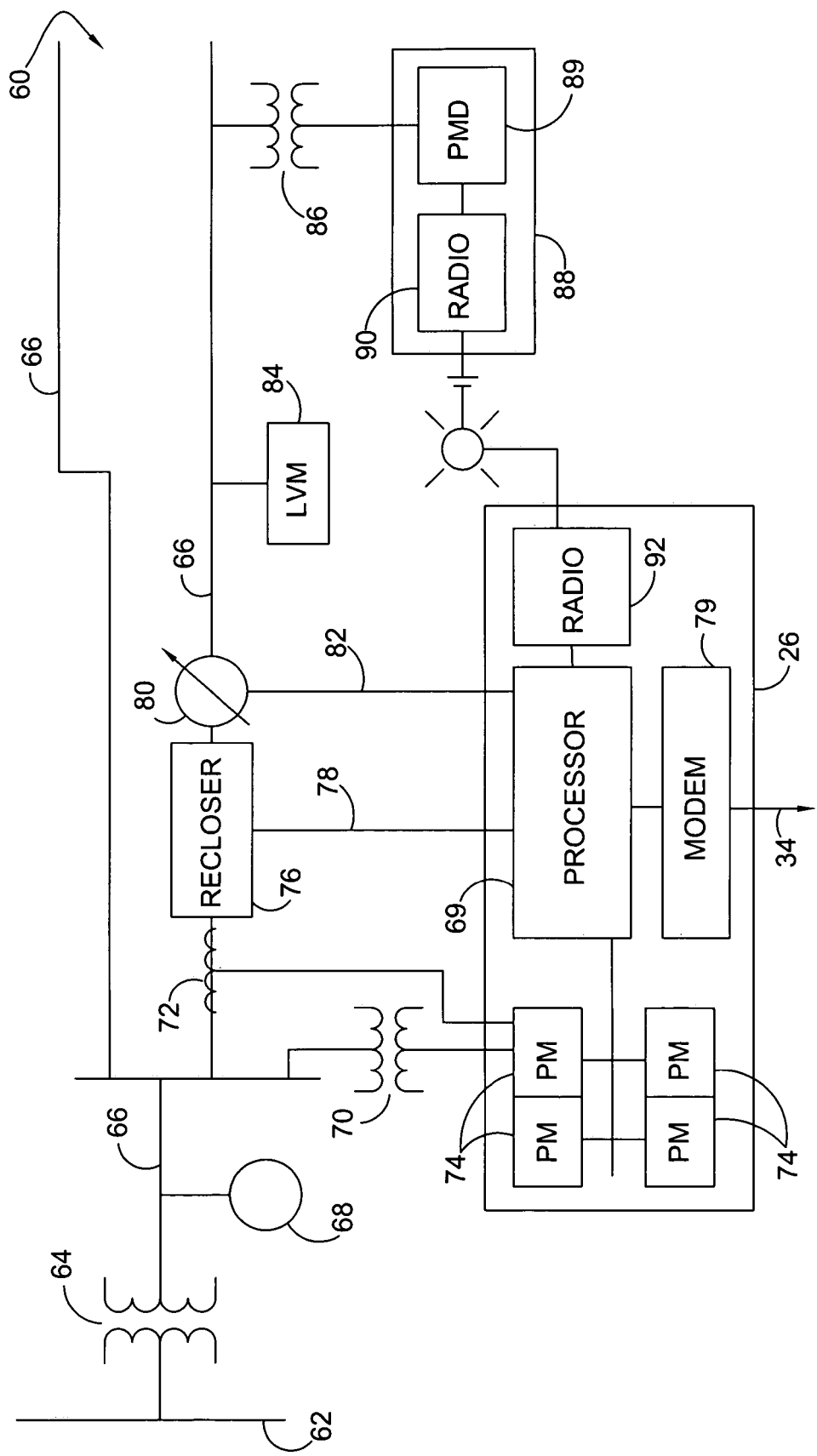
FIG. 3 is a block diagram of an example of a portion of a power distribution system using the power controller of FIG. 2.

FIG. 3 is a block diagram of an exemplary system 60 illustrating application of the power controller 24 of FIG. 2. In the exemplary system 60, electrical power is distributed at a first voltage, such as 115 kiloVolts, over bus 62. The electrical power is stepped down to a reduced voltage, such as 12.5 kiloVolts, by a transformer 64, and is transmitted downstream via a bus 66. A billing meter 68 may be coupled to the bus 66. The local controller 26 includes one or more processors 69.

Taps 70 and 72 are coupled to a power monitor PM 74 in the local controller 26 to allow the processor 69 to monitor electrical parameters associated with the power controller 24. In one embodiment, the power monitor PM 74 monitors voltage. In one embodiment, the power monitor PM 74 monitors power factor. In one embodiment, the power monitor PM 74 monitors electrical power. In one embodiment, the power monitor PM 74 monitors current. A conventional recloser or circuit breaker 76 is coupled in series with the bus 66 and is coupled to the processor 69 in the local controller 26 via a data path 78, allowing monitoring and/or control of the recloser 76.

The processor 69 in the local controller 26 is coupled to the group controller 16 (FIG. 1) via data path 34. In this example, a conventional modem 79 is employed for bidirectional data transfer.

A voltage regulator 80 is coupled in series in the bus 66. The voltage regulator 80 is responsive to control signals delivered from the processor 69 in the local controller 26 via a data path 82, and the local controller 26 also is able to collect status data from the voltage regulator 80 via this data path.

Electrical power is then transferred downstream via the bus 66, which may include line voltage monitors LVM 84 deployed at strategic locations in the distribution system and in data communication with the local controller 26. In one embodiment, a step-down transformer, instrument transformer, potential transformer or transducer 86 located near the point of use transforms the intermediate voltage employed on the bus 66 to voltages suitable for sensing equipment such as a sensing module 88. The device 86 is calibrated to permit readings corresponding to user voltages but is not necessarily as precise as transformers used to transform intermediate transmission voltage levels to end use voltage levels or in conjunction with power metering purposes.

The module 88 for measuring electrical parameters associated with delivered power and/or voltage is typically located at or near the transformer or device 86, between or near the transformer or device 86 and the end user 32 (FIG. 1), and may include power measurement devices PMD 89 for billing purposes. The module 88 is in data communication with the local controller 26 via a data path, in this example, via a radio 90 that exchanges radio signals with a radio 92 that is coupled to the processor 69 in the local controller 26.

Data communications via the various links may be effected using any known or conventional data transfer protocol, method and/or infrastructure. Non-limiting examples of transactions protocols usable under the present teachings include UCA™, Modbus™, ASCII, DNP3, etc. Non-limiting examples of usable physical infrastructure include coaxial cable, twisted pair, RF, infra-red, fiber optic link, etc. UCA is a registered mark owned by Electric Power Research Institute, Inc., Palo Alto, Calif., 94303. Modbus is a registered mark owned by Gould, Inc., Rolling Meadows, Ill., 60008.

Figure 4:
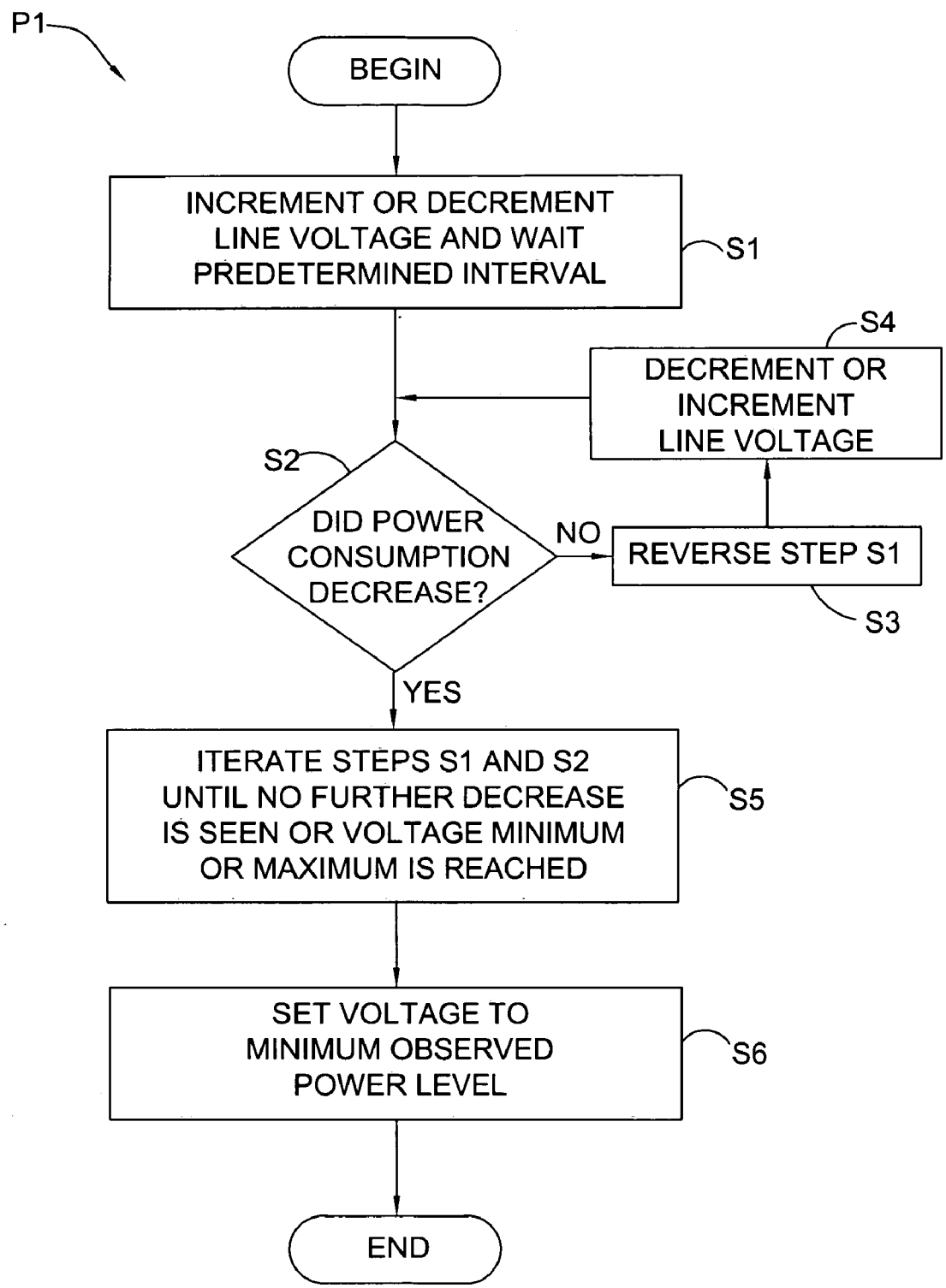
FIG. 4 is a flow chart of a process for managing the electrical power distribution system of FIG. 1.

FIG. 4 is a flow chart of a process P1 for managing the electrical power distribution system 10 of FIG. 1.

The process P1 begins with a step S1. In the step S1, the local power controller 24 of FIGS. 1 through 3 increments or decrements at least one parameter associated with electrical power that is being distributed, such as line voltage. The process P1 then waits for a predetermined interval for the system to settle, which, in one embodiment, may range from about forty seconds to two minutes.

In a query task S2, the process P1 determines if the actions taken in the step S1 resulted in a decrease in power consumption. When the query task S2 determines that the actions taken in the step S1 resulted in an increase in power consumption, control passes to steps S3 and S4. When the query task S2 determines that the actions taken in the step S1 resulted in a decrease in power consumption, control passes to a step S5.

In the step S3, the actions taken in the step S1 are reversed. In other words, when the query task S2 determines that overall power consumption increases when the voltage decreases, the power controller 24 then returns to that voltage setting initially present and waits for the system to settle in the step S3. The process P1 then increases the voltage in the step S4 and again waits for the system to settle. Similarly, when the query task S2 determines that overall power consumption increases when the voltage increases, the power controller 24 returns to that voltage setting initially present and waits for the system to settle in the step S3. The process P1 then decreases the voltage in the step S4 and again waits for the system to settle. Following the step S4, control passes back to the query task S2.

The increments in voltage are subject to predetermined voltage maximum and minimum values, which may in turn depend on or be changed in response to system conditions. In other words, if the voltage is initially at the predetermined minimum, the process P1 tests the system with an increase in voltage but not a decrease.

When the query task S2 determines that the power consumption has decreased, the process P1 iterates the steps S1 and S2 (which may include steps S3 and S4) in a step S5. The iteration of the step S5 continues until no further decrease in power consumption is observed. In other words, the process P1 determines a line voltage consistent with reducing overall power consumption.

The process P1 then sets the line voltage to the optimum voltage or the voltage at which minimum power consumption occurred in a step S6. The process P1 then ends.

Figure 5:
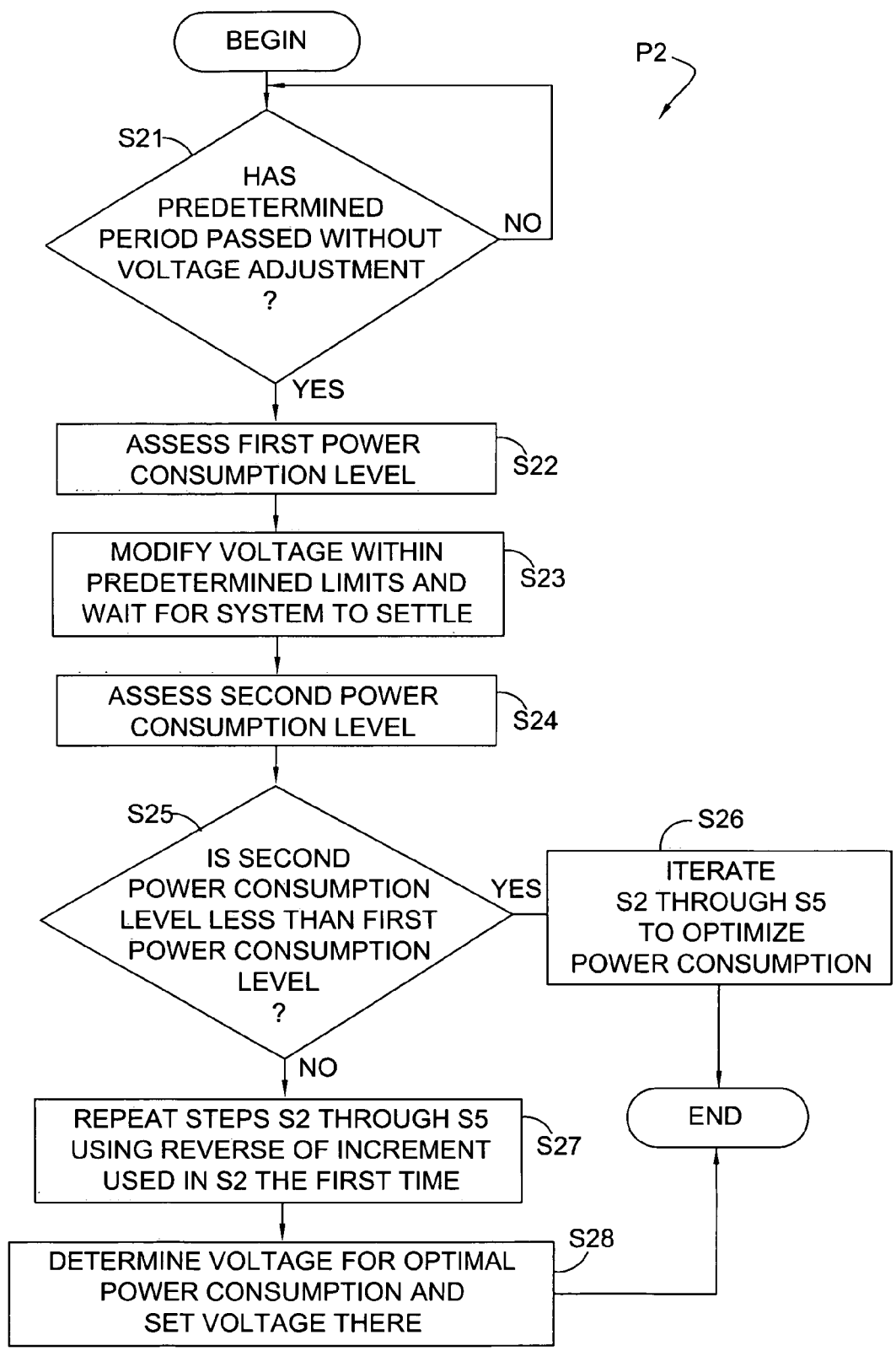
FIG. 5 is a flow chart of a process for operating the power controller of FIG. 2.

FIG. 5 is a flow chart of a process P2 for operating the power regulation devices 24 or the local controller 26 of FIG. 2. The process P2 begins with a query task S21.

In the query task S21, the process P2 determines when a predetermined interval has passed without a voltage adjustment occurring. In one embodiment, the predetermined interval is in a range of one half hour to one hour.

When the query task S21 determines that such an interval has not passed without a voltage adjustment, control passes back to the step S21. When the query task S21 determines that such an interval has passed without a voltage adjustment, control passes to a step S22.

In the step S22, a first power consumption level is measured. Control then passes to a step S23.

In the step S23, the power controller 24 adjusts a line voltage within predetermined limits and then waits for a predetermined interval for the system to settle. In one embodiment, the predetermined settling interval is in a range of from forty seconds to two minutes. Control then passes to a step S24.

In the step S24, a second power consumption level is measured. Control then passes to a query task S25.

In the query task S25, the process P2 determines when the second power level is less than the first power consumption level. When the query task S25 determines that the second power consumption level is less than the first power consumption level, control passes to a step S26. When the query task S25 determines that the second power consumption level is greater than the first power consumption level, control passes to a step S27.

In the step S26, the process P2 iterates the steps S22 through S25 to determine a line voltage associated with optimal power consumption levels and set the voltage to this level. The process P2 then ends.

In the step S27, the process P2 iterates the steps S22 through S25 but with the increment reversed from the increment or decrement employed in the first instantiation of the step S22. Control then passes to a step S28.

In the step S28, the process P2 determines a voltage for optimal power consumption in the system and sets the voltage to that level. The process P2 then ends.

Figure 6:
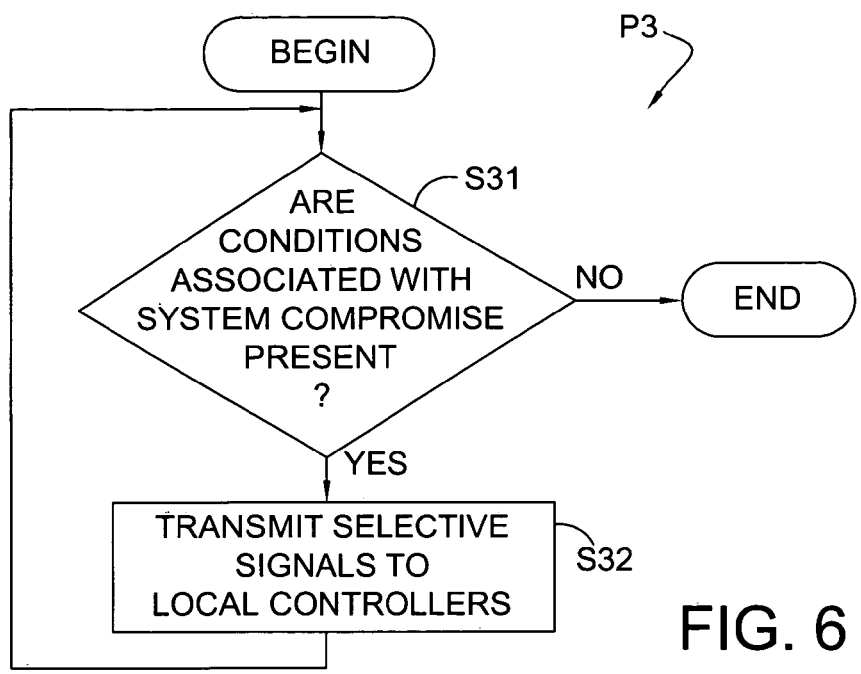
FIG. 6 is a flow chart of a process for managing the electrical power distribution system of FIG. 1.

FIG. 6 is a flow chart of a process P3 for managing the electrical power distribution system 10 of FIG. 1. The process P3 begins in a query task S31.

In the query task S31, a group controller 16 determines when conditions associated with an increased probability of compromise of appropriate delivery of electrical power are present.

This may be forecast from observed power consumption trends and knowledge of prevailing conditions, analogous to situations invoking conventional power peak demand management techniques such as demand control, or it may be due to observable emergency electrical disturbance caused by a catastrophe of one sort or another. These kinds of situations have been dealt with in the past using ON/OFF switching of one sort or another for shedding portions or all of the load.

When the query task S31 determines that such conditions are not present, the process P3 ends. When the query task S31 determines that such conditions are present, the group controller 16 transmits signals to local controllers 26 to cause them to set the power controllers 24 to predetermined values consistent with reduction of system power requirements in a step S32. Control then passes back to the query task S31.

For example, when the system is subject to severe loading, delivered voltage reduction may be implemented. The initial delivered voltage might, for example, have been 117 volts. As the voltage is being incrementally reduced towards 110 volts (representing the lower setpoint), and the system is being monitored, a minimum in power consumption might occur at 112 volts. The controller of the present disclosure will locate this minimum and can set the delivered voltage to that value. When system conditions will not support system loading, even at the lower setpoint, the setpoints may be reset or other corrective actions described herein may take place, depending on circumstances.

The disclosed arrangement provides greater flexibility than prior systems in that incremental voltage or power adjustment is possible and practical, and may be automatically implemented. In one embodiment, and under appropriate conditions, some users, such as residential users and some types of commercial users, are denied power or are provided with reduced power at a first power level, while other users, such as hospitals, emergency facilities, law enforcement facilities and traffic control systems, are provided with power at a second power level that is greater than the first power level or are left at full power. In one embodiment, multiple tiers of users are provided with various grades of power reduction or non-reduction.

In some areas, hydroelectric or other electrical power generation systems have been extensively developed, while other areas may not lend themselves to such development. One example of the former occurs in the Pacific Northwest, where hydroelectric power generation capabilities have been extensively developed. As a result, power generation facilities in the Pacific Northwest are able to produce more power than may be needed in that geographical area from time to time.

A delivery area such as California, on the other hand, has extensive power needs but has limited ability to produce electrical power, and is bordered by desert areas that also do not lend themselves to hydroelectric power production. Thus, power stations in the Pacific Northwest may be able to, and in fact do, sell electricity generated in the Pacific Northwest to users in other places, such as California.

This leads to some fluctuations in demand in the Pacific Northwest power generation stations. At times, reductions in demand in the generation area (in this example, the Pacific Northwest) require that the system dissipate some of the electrical power that is generated there in order to preserve synchronization of the generators with each other and with other portions of the grid. In at least some cases, this need to dissipate electrical power is met by coupling large resistors across the generators. Typically, these are very large conventional nichrome wire resistors.

In some situations, the need to slew power into these resistors can arise rather abruptly. For example, when weather-, earthquake-, fire- or vehicular-driven events damage a portion of the distribution infrastructure in the delivery area or between the delivery area and the generation area, rapid changes in system dynamics are possible.

However, the controllers 16 and 24 of the present disclosure can be advantageously employed to increase voltage that is delivered in the generation area and in other portions of the grid that is serviced by generators in that area. The controllers 16 and 24 can adjust delivered voltages upward but stay within the predetermined limits appropriate for normal power service. As a result, system stability is increased.

Figure 7:
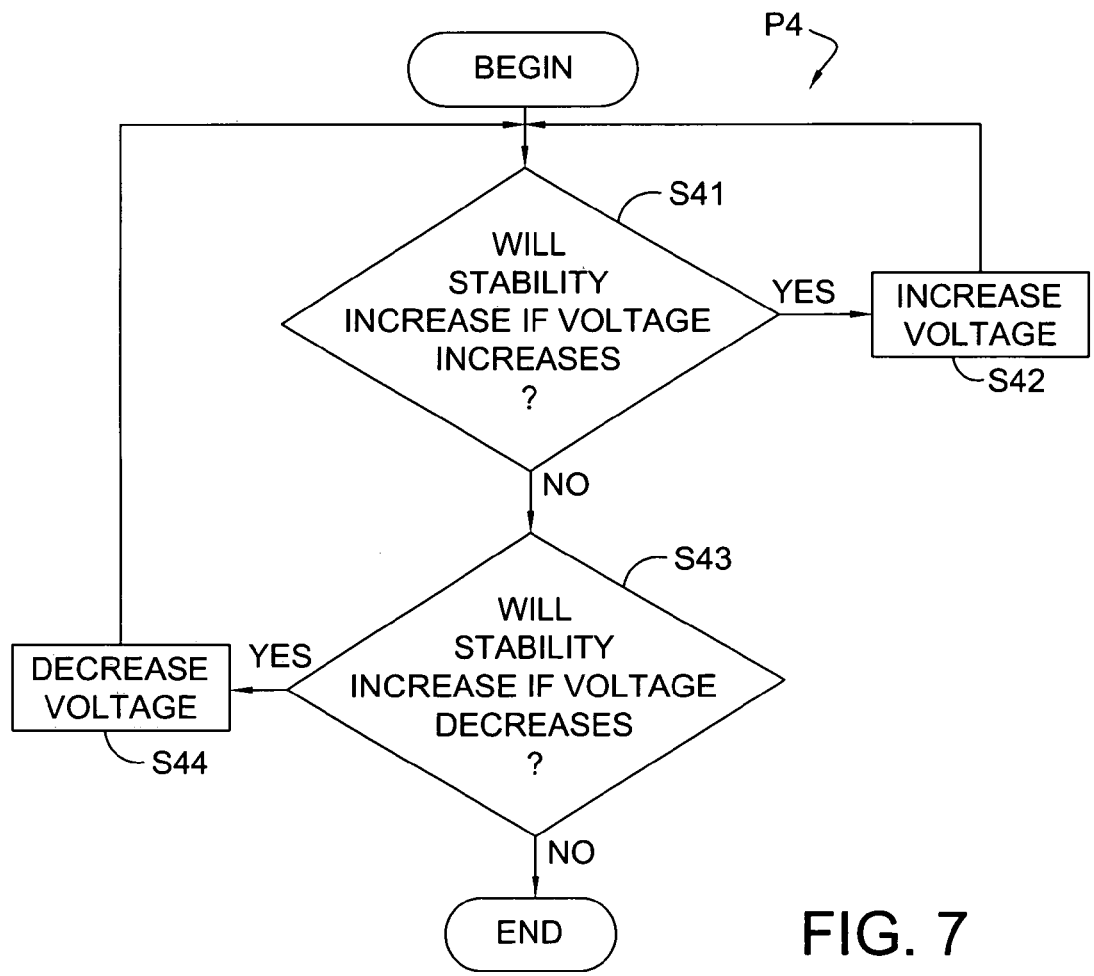
FIG. 7 is a flow chart of a process for stabilizing the electrical power distribution system of FIG. 1.

FIG. 7 is a flow chart of an exemplary process P4 for stabilizing the electrical power distribution system 10 of FIG. 1 using controllers such as 16 and 24.

The process P4 begins with a query task S41. In the query task S41, the process P4 determines when an increase in delivered voltage, within the predetermined voltage setpoints, will result in improved stability for the system 10.

When the query task S41 determines that an increase in voltage is appropriate for improving stability of the system 10, control passes to a step S42.

In the step S42, a controller in the system such as the group controller 16 increases the voltage delivered to the users 32. Typically, the increase in voltage is incremental, as discussed hereinbefore, and is followed by a predetermined settling period and then data collection regarding system parameters. Control then passes back to the query task S41 to determine if another increase in voltage is appropriate for the system 10.

When the query task S41 determines that an increase in voltage is inconsistent with an increase in stability of the system 10, or is not appropriate for such system 10, control passes to the query task S43.

In the query task S43, the process P4 determines when a decrease in delivered voltage is appropriate for increasing stability for the system 10 and is consistent with the predetermined setpoints. When the query task S43 determines that a decrease in delivered voltage is appropriate for increasing system stability, control passes to a step S44.

In the step S42, a controller in the system such as the group controller 16 decreases the voltage delivered to the users 32. Typically, the decrease in voltage is incremental, as discussed hereinbefore, and is followed by a predetermined settling period and then data collection regarding system parameters. Control then passes back to the query task S41 to determine if an increase in voltage is appropriate for the system 10. The process P4 then ends.

It will be appreciated that the processes P1 through P4 are cooperative with each other and with other processes carried out in the system 10. For example, when the system 10 no longer poses a stability issue, the process P4 may be terminated and power control may be determined by other factors in the system. Additionally, the processes P1 through P4 are structured to maintain delivered voltage at an appropriate level, such as within a range determined by programmable setpoints. Processes P1 through P4 may employ suitable methods from the engineering arts of automatic control theory and signal processing, including filtering, system identification, and prediction or extrapolation methods.

From the foregoing, it is apparent the present disclosure describes systems, processes and apparatus which can be utilized to monitor and manage electrical power distribution. Further, the disclosed systems, processes and apparatus permit power conservation and also can provide more robust power delivery under inclement power system loading conditions. In addition, the systems, processes and apparatus of the present disclosure are cost effective when compared with other power management devices.

Empirical studies have shown that overall system operation may be improved by incorporating signal processing and conditioning techniques, prediction of load variations based on measured and recorded system operation parameters and known ambient condition variation patterns affecting energy demand.

For example, the voltage regulator 40 of FIG. 2 is generally capable of a finite number of switching events during the useful life of the regulator 40.

Typical voltage regulating autotransformers operated by the electric utilities effect changes to their output voltage by mechanical selection of predetermined winding taps. The mechanical selection process limits the effective operating duty cycle and the useful life of the regulator. As a result, it is desirable to implement a scheme which controls the delivered voltage such that energy conservation or other objectives are achieved while operating the voltage regulators in a manner that is consistent with their limitations.

Additionally, the response time of such regulators 40 does not favor attempting to correct high frequency "spikes" such as may result from switching of high draw loads such as large motors. As a result, filtering signals derived from the sensors 30 of FIG. 1 to limit frequency of voltage adjustment by the regulators 40 to about twelve to fifteen switching events per day extends regulator life while maintaining control of the delivered voltage. Accordingly filtering operations may be applied to the sensed signals to improve system operation; in the present context, low pass filtering is indicated.

Delay behavior in filtering operations affects control system operation and thus design. In many closed loop control applications, including certain process control problems in which well-behaved step response is desirable (that is, step response which exhibits neither overshoot nor oscillation), filters manifesting constant group delay in the passband may be employed. In the present context, delivered voltage regulation is implemented using discrete tap selection in the final control element, resulting in small disturbances to the distribution circuits which are stepwise signals. Since stability of the controlled variable (the circuit voltage) is a design consideration in the automatic voltage control systems considered here, constant group delay low pass filtering may be usefully applied to the measured voltage signals.

In one embodiment, a discrete-time finite impulse response low pass filter having a linear phase response, a cutoff frequency of about 3 milliHertz, and a constant total group delay of about 240 seconds is implemented digitally as a cascade of filter sections provides effective signal conditioning. The cutoff frequency may be varied or tailored to specific applications based on knowledge of load characteristics.

A finite impulse response or FIR filter is a filter whose output signal $v_n$ depends only upon prior observations of the input signal and may be modeled as $v_n = \Sigma b_i v_{n-i}$, where $b_i$ represents filter coefficients and $v_{n-i}$ represents input voltages. This type of filter is conveniently realizable as a two stage filter implemented as software using reduced numerical precision compared to some other types of filters. However, such FIR filters are not limited to two stage implementations—cascade arrangements of three or more stages (i.e., multiple-stage) can also be used. FIR filters tend to exhibit less sensitivity to the numerical precision of the corresponding processor, and overall better performance (i.e., interpreted as conformance of the implemented filter to its design parameters), than do other types of software implemented filters.

In a multiple stage filter, each successive stage operates at a slower sampling rate than the preceding stage, with the sampling rate determined by the spectral cutoff characteristics of the preceding stage. For example, the first stage may use a sample rate corresponding to one sample per fifteen seconds and may be an eighth or ninth order stage. The second stage may use a sample rate corresponding to one sample per 60 to 90 seconds, as determined by the cutoff frequency $\omega_c$ of the first stage, and may be a sixth order stage. The second stage would then provide an output signal every 240 to 300 seconds without aliasing. The filter design is motivated by a desire to achieve suitable spectral cutoff characteristics whilst reducing the overall group delay of the multistage system. In general, as filter order increases in low-pass FIR designs, filter delay increases and this may have deleterious effects on closed-loop system stability, because closed loop control systems are susceptible to destabilization both by transport and other measurement delays and by signal artifacts introduced by sensors, transducers, filters or other signal processing operations in the measurement process. In this application, linear phase or constant group delay, whereby all passband spectral components of the measured voltage signals are delayed equally, corresponds to a lack of "ringing" that could otherwise result in system instability. In other words, linear phase finite impulse response filters can inhibit overshoot or ringing behavior in the filtered signal. In this type of application, a lack of delay and amplitude distortion is important for stable system operation. An exemplary infinite impulse response filter characteristics suitable for such applications uses the Bessel characteristic, which provides a good approximation to linear phase response in the passband.

Figure 8:
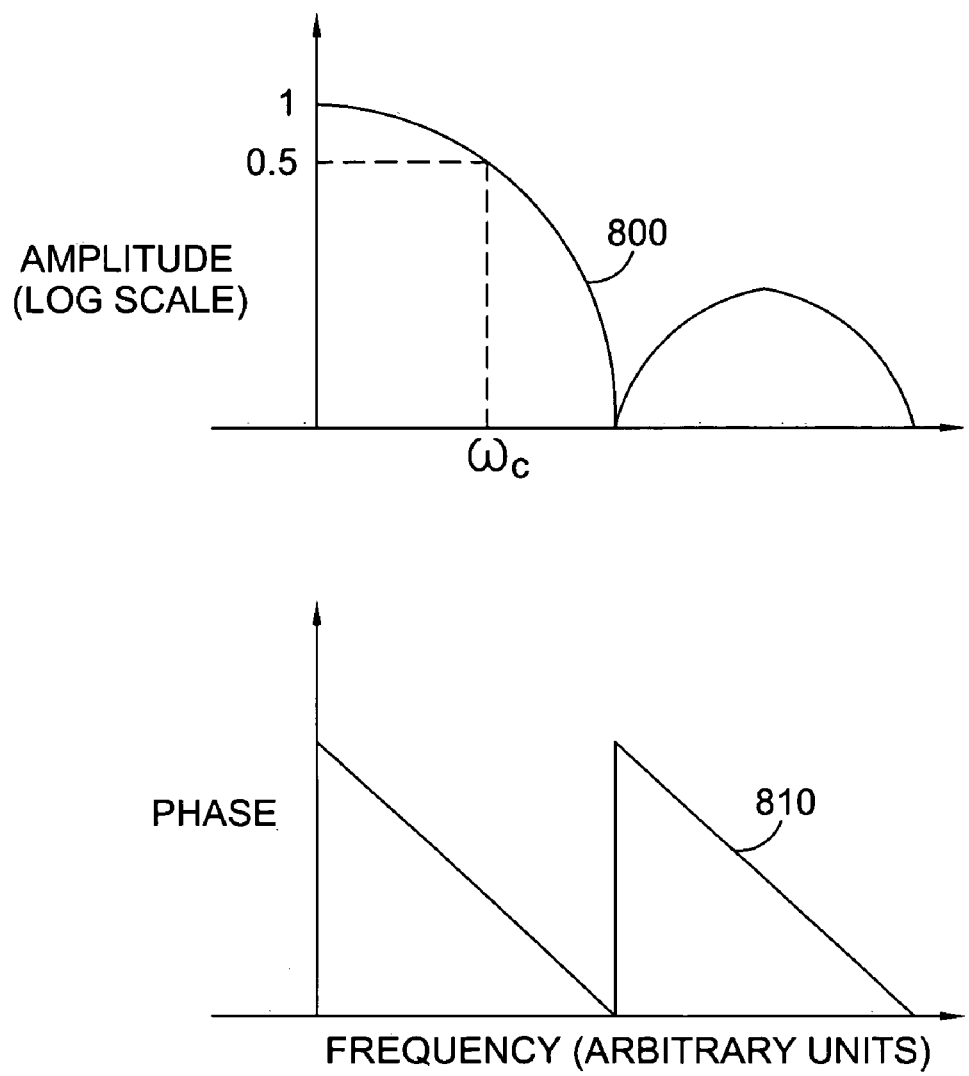
FIG. 8 is a graph of amplitude and phase response for a low pass filter.

FIG. 8 is a graph of amplitude 800 and phase 810 response for a low pass filter. The amplitude response 800 shows a cutoff frequency $\omega_c$ which is defined as the frequency at which the filter response is one-half of the peak response value. The phase response 810 depends linearly on frequency.

Use of linear prediction techniques can improve system operation when such prediction is employed in order to remove delays associated with the low-pass filtering of observed and controlled signals. These techniques model the subject signals as a combination of moving average and autoregressive structures, and generally the coefficients associated with such structures are estimated continually during the operation of the control system that is connected to the process or system that is generating the subject signals. The estimation may be carried out by methods suited to the properties of the subject signals and the requirements of the aforementioned signal model, and may include such methods as gradient search, spectral factorization, or recursive least squares.

The removal of filtering delay can improve system stability and facilitate rapid control system response in emergency situations. Linear prediction techniques treat the input signal as conforming to a dynamical model comprising both spectral and stochastic components, in which the stochastic component is assumed to evolve as a Gaussian process which is stationary over a suitable estimation interval. In the present case, a signal that is second-order stationary over an interval of approximately 30 minutes is consistent with prediction capabilities of approximately 5 to 10 minutes.

Linear prediction models comprise a class of methods employed for the temporal extrapolation of stationary signals. In such models, the one step ahead predicted value $y_{+1}$ of a signal $y_n$ can be formulated as a function of a number of prior signal samples, or $y_{n+1} = \Sigma d_j y_{n-j}$, where the coefficients $d_j$ depend on the statistics extracted from the signals and on the algorithm being employed, and are estimated using a process such as those noted supra. Other examples include autocorrelation methods, such as Levinson-Durbin recursion of a corresponding Toeplitz matrix.

Figure 9:
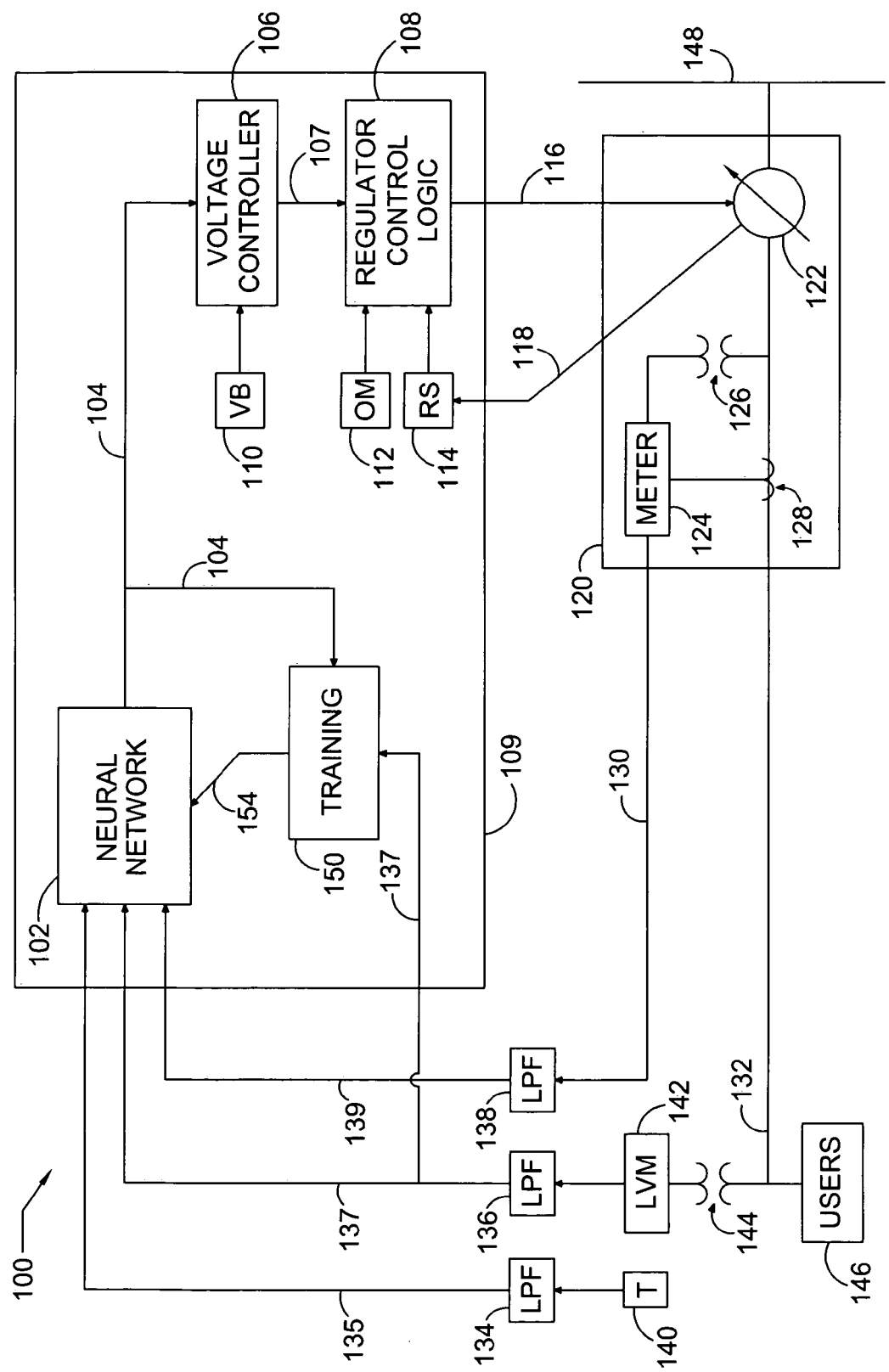
FIG. 9 is a block diagram of a closed-loop control system in accordance with one embodiment of the presently disclosed concepts.

FIG. 9 is a block diagrammatic view depicting a closed-loop control system (system) 100 in accordance with one embodiment of the present teachings. The system 100 includes an Artificial Neural Network (ANN) 102. The ANN 102 can be defined by any suitable such neural network configured to receive conditioned input signals (135, 137 and 139—described hereinafter), to predict a future value of a predetermined electrical parameter, and to provide a signal 104 in accordance with that prediction. As depicted in FIG. 9, such an electrical parameter is defined by a remote line voltage 132 (discussed in further detail hereinafter). The system 100 also includes a voltage controller 106. The voltage controller 106 is configured to receive the signal 104 from the ANN 102, as well as voltage boundary (or range, VB) data 110. The voltage controller 106 then derives a signal 107 that is coupled to regulator control logic 108. Regulator control logic 108 also receives input signals from an operating mode (OM) entity 112 and a regulator status (RS) entity 114, respectively.

As used herein, the term Voltage Boundary or Primary Voltage Bounds (VB) refers to the desired limits within which the primary voltage, as measured at a remote location, shall be controlled. As also used herein, the term Operating Mode (OM) is a mnemonic defining a class of allowable controller actions, specifically including at least the following:

Idle—control of a remote voltage is inactive, and distribution voltage is set by other means including, for example, open loop (i.e., no feedback) control;

Engaged—control of remote voltage is enforced entirely by the system (i.e., embodiments thereof) described herein; and Suspended—a temporary condition in which voltage adjustment is disallowed, pending resolution of dispatcher activity or a system anomaly such as, for example, communications interference. As further used herein, the term Regulator Status (RS) refers to a group of signals that, when taken together, permit determination of the operational readiness of the regulating autotransformer, load-tap-changer transformer, and/or their control interface devices.

As also depicted in FIG. 9, the regulator control logic 108 provides an output signal 116. The output signal 116 is properly formatted and conditioned to be received by a voltage regulator 122 within an electrical distribution substation 120. The voltage regulator 122 can be defined, for example, by a make-before-break variable tap regulator, configured respond to the output signal 116 by increasing or decreasing the distribution line voltage 132 that is derived from transmission line voltage 148. A regulator status signal 118, indicative of present tap selection or other suitable status information, is provided back to the regulator status entity 114. As depicted in FIG. 9, the substation 120 includes a potential transformer 126 and a current transformer 128 that provide respective electrical parameter signals to a meter 124. The meter 124 can be selected and/or configured to sense and/or derive any one or more electrical parameters such as, for example, line voltage, line current, real power, power factor, VARs, apparent power, etc. The meter 124 provides a signal 130 indicative of one or more such electrical parameters.

Still referring to FIG. 9, the system 100 includes first, second and third low pass filters (LPFs) 134, 136 and 138, respectively. The LPF 134 receives an ambient temperature signal from a sensor 140 and provides a corresponding filtered (i.e., conditioned) temperature signal 135. The LPF 136 receives a remote line voltage (e.g., line voltage 132) signal by way of a line voltage monitor 142 and associated potential transformer 144, and provides a filtered remote line voltage signal 137. Similarly, the LPF 138 receives the signal 130 from the meter 124 and provides a filtered signal 139. It is to be understood that each of the filtered (conditioned) signals 135, 137 and 139 can be referred to as indicative of am environmental or electrical distribution system parameter, respectively. Furthermore, other selected parameters (not shown in FIG. 9) such as, for example, ambient humidity, core temperature of a transformer, daylight intensity, remote location power factor, VAR compensator activity, etc., can be sensed and provided as conditioned signals by way of corresponding sensors and low pass filter arrangements. In any event, the respective conditioned signals 135, 137 and 139 are provided as inputs to the Artificial Neural Network 102. In this way, the system 100 of FIG. 9 depicts a closed-loop control stratagem capable of providing stable remote line voltage to one or more users 146.

The system 100 of FIG. 9 also includes a training entity 150. The training entity is defined by any suitable logic configured to receive the conditioned signal 137 (i.e., representative of remote line voltage 132) and the Artificial Neural Network prediction signal 104, and to derive a training (or learning) vector 154 that is communicated to the ANN 102. In another embodiment (not shown), the training entity 150 can be configured to also receive either (or both) of the conditioned signals 135 and 139. In any case, the training entity 150 serves in the ongoing development or "maturity" of the Artificial Neural Network 102 with respect to (at least) these observed system variables or parameters. Thus, the ANN 102 evolves by way of an ever-improving set of observational vectors correlated with predicted future values of the electrical parameter(s) of interest (e.g., remote line voltage, remote power factor, local line voltage, etc.). As also depicted in FIG. 9, at least the ANN 102, the voltage controller 106, the regulator control logic 108 and the training entity 150 define a single control entity 109 of the system 100.

The Artificial Neural Network (ANN) 102 of FIG. 9 is used as a predictor of measured voltages (e.g., remote line voltage, etc.). Such an ANN (e.g., 102) can be defined, for example, an ADALINE formulation, a Multi-layer Perceptron or a Radial Basis Function Network (RBF). In the case of an RBF, either Euclidean or Mahalanobis distances can be used in the formulation. In one preferred embodiment, an RBF Network is used wherein the input variables must include measured remote voltage (after low pass filtering), and may include ambient temperature at remote and/or substation, and/or real power demand and/or apparent power demand. Also in such an embodiment, the predicted observed variable (i.e., parameter) is the measured remote voltage (after filtering). Table 1 below summarizes an exemplary formulation:

TABLE 1

Exemplary Neural Network Formulation

| | |
|---|---|
| MLP: | typical activation functions for the input and hidden layers are sigmoid, hyperbolic tangent, linear; |
| MLP: | typical activation functions for the output layers are linear, bounded linear, step; |
| RBF: | typical activation functions for the input and hidden |

TABLE 1-continued

Exemplary Neural Network Formulation

| | |
|---|---|
| RBF: | layers are probability density functions; typical activation functions for the output layer are sigmoid, linear. |

The inputs to the ANNs are time series vectors from among the above variables (parameters), and inputs are zero mean, but trends are not removed. Also, the present teachings anticipate that ANNs can be trained to precisely eliminate the respective delays introduced through low pass filtering. Furthermore, ANNs can be trained with respect to future remote voltage observations (beyond low pass filtering delay), so that control moves can be anticipated.

To briefly summarize, one or more suitable embodiments can be defined wherein an Artificial Neural Network is used to predict future values of low pass filtered input signals (i.e., variables, or parameters). Non-limiting examples of such variables include ambient and/or equipment temperature; local and/or remote line voltage and or current; local and/or remote real power (Watts), imaginary power (VARs), and/or apparent power (VAs); etc. Other pertinent variables or operating parameters can also be measured, filtered (if needed) and used as input signals to the neural network. Additional information regarding Artificial Neural Networks, which can be used in accordance with the present teachings, is obtainable as follows:

ADALINE: B. Widrow and M. E. Hoff Jr., *Adaptive Switching Circuits*, IRE WESCON Conv. Rec., part 4, 96-104 (1960);

Multi-layer Perceptron: F. Rosenblatt, *The Perceptron: A probabilistic model for information storage and organization in the brain*, Psychological Review 65, 386-408 (1958); and Radial Basis Function Networks: D. S. Broomhead and D. Lowe, *Multivariable functional interpolation and adaptive networks*, Complex Systems 2, 321-355 (1988).

In contrast to prior art systems, the present systems, processes and apparatus provide great variability of system parameters, such as multiple, different delivered voltage levels, within predetermined limits. For example, all users can be incrementally adjusted up or down together, or some users may be adjusted to a first degree while other users are adjusted to another degree or to separate, differing degrees. Such advantageously provides new flexibility in power distribution control, in addition to providing new methods of adjustment.

In compliance with the statute, the subject matter has been described in language more or less specific as to structural and methodical features. It is to be understood, however, that the subject matter is not limited to the specific features shown and described, since the systems, processes and apparatus herein disclosed comprise exemplary forms of putting the disclosed concepts into effect. The disclosed subject matter is, therefore, claimed in any of its forms or modifications within the proper scope of the appended claims appropriately interpreted in accordance with the doctrine of equivalents.

We claim:

1. A system, comprising:
  a sensor configured to provide a sensor signal corresponding to a sensed parameter, the sensed parameter including one or more of a line voltage level, a power, or a power factor of a user facility or of a substation in a power distribution system;
  a low pass filter configured to derive a conditioned signal from the sensor signal;
  a controller including an Artificial Neural Network operable to receive the conditioned signal, the Artificial Neural Network configured to extrapolate a future value of the sensed parameter using the received conditioned signal, the controller configured to provide an output signal corresponding to the extrapolated future value; and
  a regulator configured to selectively adjust one or more of the line voltage level, the power, or the power factor that is being supplied in the power distribution system in accordance with the output signal corresponding to the extrapolated future value from the controller.

2. The system of claim 1, wherein the sensor is configured to detect the sensed parameter from a device of a user facility or a substation downstream from the regulator in the power distribution system; and wherein the sensor is further configured such that the sensed parameter includes one or more of a temperature, a humidity, an action by a VAR compensator, or an action by another a control entity.

3. The system of claim 1, further comprising a training entity, the training entity configured to receive the conditioned signal from the low pass filter and to provide a training vector to the Artificial Neural Network.

4. The system of claim 3, wherein the sensor, the low pass filter, the controller and the regulator are further configured to define a closed-loop control system.

5. The system of claim 1, wherein the sensor is further configured such that the sensed parameter is detected from a device remote with respect to the regulator.

6. The system as recited in claim 1, wherein the regulator is a voltage regulator, and wherein the voltage regulator supplies the line voltage level to a plurality of user facilities or a plurality of substations in the power distribution system.

7. The system of claim 1, wherein the regulator is configured to selectively adjust one of the line voltage, the power, or the power factor that is being supplied in the power distribution system in accordance with the output signal corresponding to the extrapolated future value from the controller to maintain the supplied line voltage, the power, or the power factor within predetermined limits in the power distribution system.

8. The apparatus method of claim 7, wherein the one or more sensed parameters being provided from a substation in a power distribution system include a line voltage, a power, or a power factor.

9. An apparatus, comprising:
  a controller device including an Artificial Neural Network, the controller device configured to receive plurality of signals respectfully corresponding to sensed parameters of a plurality of user facilities or of a substitution in a power distribution system, the Artificial Neural Network configured to extrapolate future values of the sensed parameters using the plurality of signals, the controller device configured to provide an output signal to a regulator to regulate the electrical power distribution system corresponding to the extrapolated future values by selectively adjusting one of a line voltage, a power, or a power factor of the electrical power distribution system.

10. The apparatus method as recited in claim 9, wherein the regulator is a voltage regulator, and wherein the sensed parameters includes one or more of a temperature, a humidity, a line voltage level a power, a power factor, an action by a VAR compensator, or an action by a control entity.

11. The apparatus as recited in claim 9 wherein the controller device is configured to provide an output signal to a regulator to regulate the electrical power distribution system corresponding to the extrapolated future values by selectively adjusting one of a line voltage, a power, or a power factor of the electrical power distribution system to ensure delivery of one of a line voltage, a power, or a power factor of the electrical power distribution system within predetermined limits.

12. A method, comprising:
- receiving a signal corresponding to one or more sensed parameters, at least one of the sensed parameters being provided from a substation in a power distribution system;
- filtering the signal so as to derive a conditioned signal there from;
- feeding the derived conditioned signal to an Artificial Neural Network;
- using the Artificial Neural Network to generate a prediction signal indicating a prediction of a future value of the one or more sensed parameters from the derived conditioned signal;
- delivering with a voltage regulator one or more electrical parameters from a power station downstream to a substation in a power distribution system, the one or more electrical parameters including a line voltage, a power, or a power factor; and
- adjusting the voltage regulator in response to the prediction signal to modify the one or more electrical parameters including the line voltage, the power, or the power factor being delivered from the power station downstream to the substation in the power distribution system, the voltage regulator being adjusted in accordance with the predicted future value of the one or more sensed parameters to maintain delivery of the one or more electrical parameters to the substation in the power distribution system within predetermined limits.

13. The apparatus method of claim 12, wherein the one or more sensed parameters include a temperature, a humidity, a line voltage, a power, a power factor, or an action by another a control entity.

14. The method of claim 12, wherein the derived conditioned signal is derived from one of a temperature, a humidity, a line voltage, a power, a power factor, or an action by another control entity, wherein the Artificial Neural Network predicts the future value of a line voltage, a power, or a power factor from the derived conditioned signal.

15. The apparatus method of claim 12, wherein the one or more sensed parameters include a temperature, a humidity, or an action by another a control entity.

* * * * *